United States Patent [19]
Osgerby

[11] Patent Number: 4,498,289
[45] Date of Patent: Feb. 12, 1985

[54] CARBON DIOXIDE POWER CYCLE

[76] Inventor: Ian Osgerby, c/o Dennis R. Lowe, Esq., 1842 Massachusetts Ave., Lexington, Mass. 02173

[21] Appl. No.: 453,724

[22] Filed: Dec. 27, 1982

[51] Int. Cl.³ .............................................. F02N 25/06
[52] U.S. Cl. .................. 60/39.52; 60/39.04; 60/39.17; 60/647
[58] Field of Search ................ 60/39.52, 39.17, 39.04, 60/647, 651, 671, 650, 682

[56] References Cited

U.S. PATENT DOCUMENTS 3,736,745  6/1973  Karig .............................. 60/39.52 X
4,148,185  4/1979  Somers ................................ 60/39.17

Primary Examiner—Allen M. Ostrager
Attorney, Agent, or Firm—Jerry Cohen; M. Lawrence Oliverio

[57] ABSTRACT

An improved direct fired power system generating and employing a combustion gas which includes carbon dioxide or a working fluid including a combustion chamber (20) for burning a mixture which includes oxygen, carbonaceous fuel and recycled carbon dioxide working fluid at a first pressure of above 1100 PSI thereby providing a combustion gas which includes carbon dioxide and water at substantially the first pressure and above 31° C. A first turbine (16) allows the gas to expand therethrough to generate power and reduce the combustion gas pressure to a second pressure below 1100 PSI while maintaining gas temperature above 31° C. A second burner (20) heats the combustion gas to a higher temperature and a second turbine (21) allows the gas to expand therethrough to generate power and reduce the pressure to a third pressure while maintaining gas temperature above 31° C. A heat exchanger (26) includes ducts (28), (30) in heat exchange relationship. Duct (30) conducts recycled carbon dioxide working fluid at substantially the first pressure therethrough and to the combustion chamber. Duct (28) conducts combustion gas from turbine (21) therethrough to transfer heat to the recycled carbon dioxide working fluid to condense at least a portion of the water in the combustion gas but maintain the carbon dioxide thereof in a gaseous phase. Condensed water is separated from the gas. A condensor (33) cools the gas to a first temperature above 31° C. and a compressor (42) compresses the gas to a fourth pressure of at least 1100 psi but below the first pressure. A second condensor (44) cools the gas to a second temperature below the first temperature but above 31° C. and a second compressor (24) compresses the gas to substantially the first pressure to provide recycled carbon dioxide working fluid which is delivered to heat exchanger (26).

19 Claims, 6 Drawing Figures

|    | T(°C) | H cal/g  | P      |
|----|-------|----------|--------|
| 1  | 68    | 157      | 3000   |
| 2  | 922   | -1905.6  | 3000   |
| 3  | 1265  | -1796.3  | 3000   |
| 4  | 936   | -1897.2  | 588    |
| 5  | 1265  | -1796.3  | 588    |
| 6  | 1007  | -1884.6  | 294    |
| 7  | 68    | -2134    | 294    |
| 8  | 34    | 192      | 294    |
| 9  | 133   | 207.5    | 1068.7 |
| 10 | 31    | 152      | 1068.7 |

|    | P        | T (°C) | H cal/g |
|----|----------|--------|---------|
| 1  | 2940 PSI | 68     | 157     |
| 2  | 2940     | 1265   | -1796.3 |
| 3  | 2940     | 1265   | -1796.3 |
| 4  | 588      | 936    | -1897.2 |
| 5  | 588      | 1527   | -1630   |
| 6  | 294      | 1255   | -1775.3 |
| 7  | 294      | 68     | -2134   |
| 8  | 294      | 34     | 192     |
| 9  | 1068.69  | 133    | 207.5   |
| 10 | 1068.69  | 31.1   | 152     |

FIGURE 4     S (ENTROPY) Cal/g-°C.

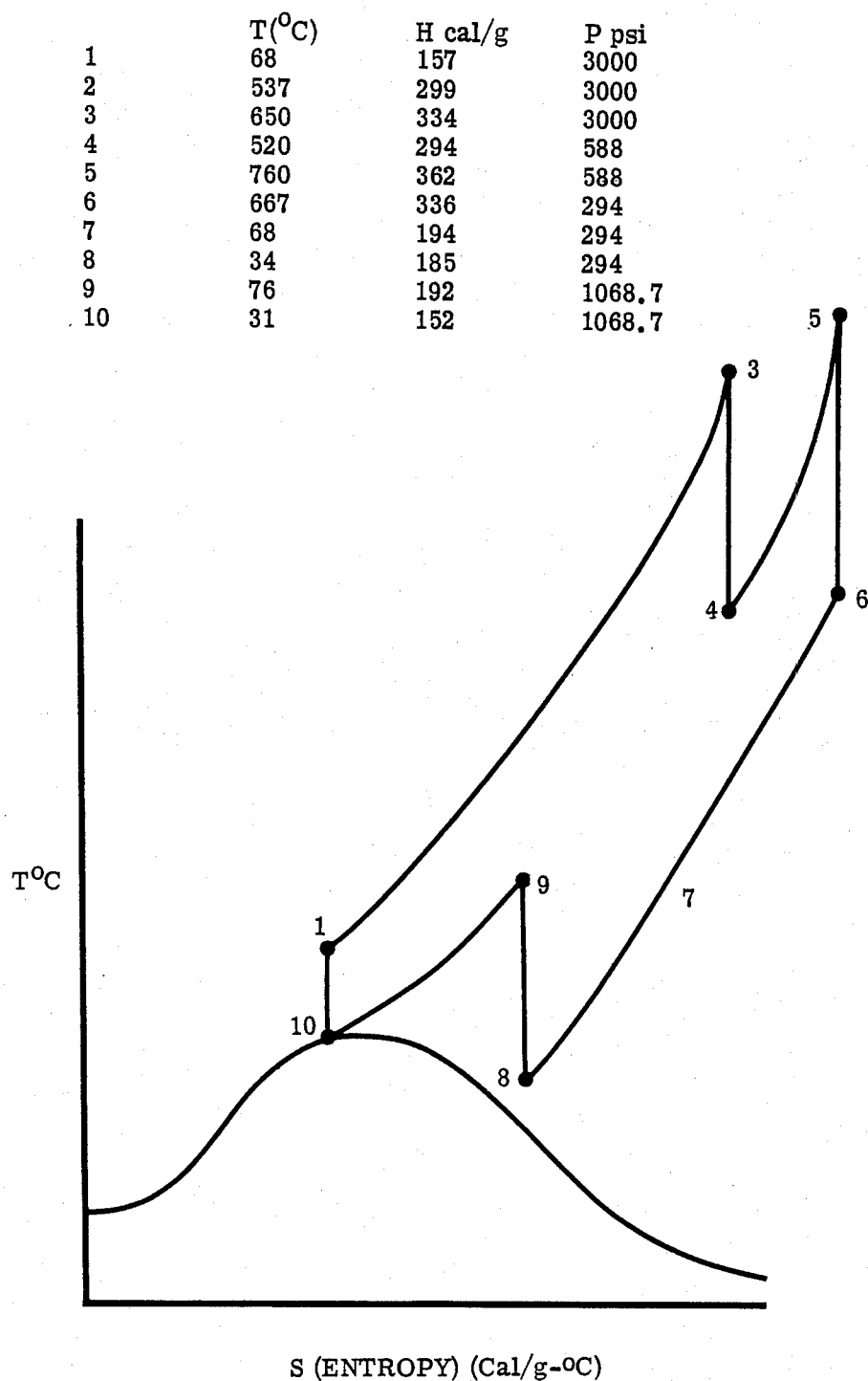
FIGURE 6  ENTROPY

CARBON DIOXIDE POWER CYCLE

BACKGROUND OF THE INVENTION

This invention relates to an improved direct fired power cycle which generates and employs a combustion gas, including carbon dioxide, as a working fluid and an indirect power cycle employing carbon dioxide in separate and distinct combustion and working fluid loops and in particular to such cycles wherein the carbon dioxide working fluid is maintained at all times in a gaseous or quasi-liquid supercritical phase. Presently, electrical energy is generated primarily by indirect firing methods. A mixture of fuel and air is burned to generate high temperature combustion gases. These gases transfer heat via heat exchange to water in a boiler, thereby boiling the water at high pressure and temperature to provide superheated steam. This steam is expanded through a steam turbine to a very low pressure thereby generating shaft power which is converted to electrical energy.

Such methods of power generation are far from optimally efficient. Where water/steam is utilized as the working fluid, extremely low pressures (e.g. below 1–2 inches Hg) must be employed in order to condense the fluid from a gaseous to liquid form for recycled use. Further large amounts of latent heat are required for the water to undergo the required phase changes. nsequently, power cycle efficiencies are typically less then 38%. Such inefficiency is compounded by several factors: Because of material constraints of high pressure (e.g. 2000–3000 psi) equipment such as boilers used by indirect systems, steam temperature must be kept below 1200° F. Because higher temperatures enhance cycle efficiency, such efficiency is thus lost in low temperature indirect systems.

The very large expansion ratios exhibited by present systems additionally necessitate the use of large expensive machinery (e.g. steam turbines). The low rate of heat transfer from hot combustion gas to water in the boiler requires that enormous combustion chambers be provided.

Present power systems (both direct and indirect) often use freely available air for combustion. However, large quantities of inert nitrogen are present in the air. Such nitrogen is useless for the generation of power (e.g. for use in the working fluid) and furthermore causes pollutants (nitric oxides) to be produced. Such pollutants must be removed thereby adding considerably to cost of the system.

Utilizing oxygen alone rather than air in the combustion step of a power cycle eliminates nitrogen from the power cycle and greatly reduces the size of equipment required by the system. For example, a high pressure (200 atm) oxygen burner requires a volume 703 times smaller than an ambient pressure air burner. However, oxygen firing is typically prohibitively expensive particularly as compared to "free" air. Very expensive materials of construction must also be utilized to accommodate the high flame temperatures generated in oxygen firing. In fact, the combustion gases produced in oxygen fired systems must be diluted with an inert medium so that such high temperatures may be moderated to levels which enthalpy recovery devices (boilers, turbines) require.

A direct fired power cycle which substitutes recycled carbon dioxide combustion product for a certain portion of the oxygen is known. U.S. Pat. No. 3,736,745. However, that system teaches maintaining the carbon dioxide working fluid above a critical pressure of 1100 psi at all points in the power cycle. At certain points, the carbon dioxide is converted far below its liquid gas interface (e.g. the $CO_2$ dome) to a liquid phase. An undesirably large amount of latent heat is lost and a significant amount of work is required to return to a gaseous phase. Further, because present materials constraints limit operation to 3000 psi, the maximum available pressure ratio is limited to 3000/1100 thus severely limiting available turbine work. Consequently, optimal efficiency is not achieved.

SUMMARY OF THE INVENTION

It is therefore an object of this invention to provide an improved carbon dioxide power system and method which exhibits enhanced energy and power generation efficiency over prior indirect and direct power systems.

It is a further object of this inventin to provide a carbon dioxide power system and method which requires smaller and less expensive equipment than prior indirect power systems.

It is a further object of this invention to provide a carbon dioxide power system and method in which carbon dioxide working fluid is recycled for combustion to provide energy savings and in which such carbon dioxide may be tapped for a wide variety of ancillary uses.

It is a futher object of this invention to provide a carbon dioxide power system and method which is readily adaptable for use with an air separation plant.

It is a further object of the invention to provide a carbon dioxide power system and method which may provide rare noble elements from its working fluid.

It is a further object of this invention to provide a carbon dioxide power system and method which is largely pollution free.

This invention features a direct fired power system generating and employing a combustion gas which includes carbon dioxide as a working fluid. By "direct fired" is meant that the combustion product itself is used to provide power generation and thus a conventional boiler and heat exchanger are not needed. Carbon dioxide ($CO_2$) is the working fluid of the system, (i.e. it undergoes turbine expansion to provide power and recompression for reuse.

As used herein, critical temperature should be understood to refer to the temperature above which $CO_2$ will not condense regardless of the pressure applied. That temperature is rounded to 31° C. for illustrative purposes herein. All temperatures above 31° C. are referred to as supercritical temperatures. Critical pressure is the maximum pressure required to condense $CO_2$ at the critical temperature of 31° C. Herein critical pressure is rounded to 1068.7 psi for illustrative purposes.

There are means defining a combustion chamber for burning a mixture which includes oxygen, a carbonaceous fuel and recycled carbon dioxide working fluid at a first pressure of at least critical level, and thereby providing a combustion gas which includes carbon dioxide and water at substantially the first pressure and above the critical temperature of $CO_2$. A first turbine is connected to the combustion chamber for receiving combustion gas therefrom and allowing the combustion gas to expand therethrough to generate power and reduce the pressure of the combustion gas to a second pressure below 1068.7 psi, but retain the combustion gas in a supercritical state, (e.g. the temperature remains sufficiently high so that the gas does not condense). Typically, the temperature remains well above 31° C., in any event.

The first turbine may be designed to provide only the power required to drive compressors, pumps and ancillary devices such as conventional gas turbines employing more than one turbine stage.

There are means connected to the first turbine for receiving the combustion gas therefrom and heating the combustion gas to a higher temperature. A second turbine is connected to the means for heating for receiving combustion gas therefrom and allowing the combustion gas to expand therethrough to generate power and further reduce the pressure of the combustion gas to a third pressure but retain the combustion gas in a supercritical state. There are means defining a heat exchanger having first and second ducts in heat exchange relationship. The first duct receives combustion gas from the second turbine and conducts the gas therethrough. The second duct conducts recycled carbon dioxide working fluid at substantially said first pressure and at a temperature below that of the combustion gas in the first duct therethrough and has an output connected to the combustion chamber for directing at least a portion of the recycled carbon dioxide thereto. The combustion gas transfers heat to the recycled carbon dioxide to condense at least a portion of the water in the combustion gas but maintain the carbon dioxide thereof in a supercritical state.

There are means for separating condensed water from the remainder of the cooled combustion gas and first means connected to the output of the first duct of the heat exchanger for receiving the combustion gas therefrom and cooling the combustion gas to a first temperature of typically above 31° C. first compression means connected to the first means for cooling for receiving the combustion gas therefrom and compressing the gas to a fourth pressure.

A second cooling means is connected to the first compression means for receiving combustion gas therefrom and cooling the gas to a second temperature at essentially the liquid/gas interface thereof. A second compression means is connected to the second means for cooling for receiving gas therefrom and compressing the gas to substantially the first pressure to thereby provide recycled carbon dioxide working fluid in a supercritical state. As used herein, "supercritical" state should be understood to define the phase of carbon dioxide above temperatures of 31° C. at which the properties of the saturated liquid or gaseous phases are identical. In effect, only one phase—the supercritical phase—exists regardless of pressure changes. The second compression means includes an output connected to the input of the first duct means of the heat exchanger for providing recycled carbon dioxide thereto.

In a preferred embodiment, the first means for cooling may include a condensor having a first duct connected between the second duct of the heat exchanger and the first compression means for conducting combustion gas therethrough and a second duct in heat transfer relationship with the first duct thereof for conducting a cooling fluid therethrough. Similarly, the second means for cooling may include a condensor having a first duct connected between the first compression means and second compression means for conducting combustion gas therethrough and a second duct in heat transfer relationship with the first duct thereof for conducting a cooling fluid therethrough.

Means may be provided for drawing carbon dioxide from the system for ancillary use. Such means are typically located between the first cooling means and first compression means. One or more noble gases may be mixed with the oxygen in the combustion chamber and thereby provided in the combustion gas. Means may be provided for drawing such noble gases from the system and such means may be connected to draw the gases from the second cooling means.

The means for separating condensed water from the combustion gas may be connected to the second duct of the heat exchanger or the first duct of the first condensor.

The second compression means may include a pump and at least a portion of the power from either the first or second turbine may be used to operate such a pump.

Air separation means, such as an air separation plant, may be utilized to provide the oxygen to the combustion chamber. This system is able to generate more power than is consumed by such a plant.

Typically, the second cooled temperature is no lower than 27° C.

A method for enhancing the efficiency of a power cycle which generates and employs a combustion gas, including a carbon dioxide as a working fluid, is also featured by this invention. A mixture which includes oxygen, carbonaceous fuel and recycled carbon dioxide working fluid at a first pressure of at least 1068.7 psi (e.g., at least critical pressure) is introduced into a combustion chamber where it is burned to provide a combustion gas which includes carbon dioxide and water at substantially the first pressure at a temperature above 31° C. (e.g. the critical temperature of $CO_2$). The combustion gas is allowed to expand through a first turbine to generate power and reduce the pressure of the gas to a second pressure below 1068.7 psi while maintaining the fluid in a supercritical state. The combustion gas is then heated to a higher temperature at substantially the second pressure and allowed to expand through a second turbine to generate power and further reduce the pressure of the combustion gas to a third pressure while maintaining a supercritical state.

The combustion gas is passed in heat exchange relationship with recycled carbon dioxide working fluid at said first pressure and a lower temperature so that heat is transferred from the combustion gas to the recycled carbon dioxide to condense at least a portion of the water in the combustion gas but maintain the carbon dioxide therein in a supercritical state. The combustion gas is cooled to a first temperature and compressed to a fourth pressure. The combustion gas is then cooled to a second temperature at essentially the liquid/gas interface and preferably above 27° C., and compressed to substantially the first pressure. Condensed water is separated from the combustion gas following either the heat exchange or cooling to a first temperature steps.

Carbon dioxide and/or one or more noble gases may be drawn from the combustion gas for ancillary use. Additional carbon dioxide working fluid may be mixed with the combustion gas prior to heating the gas. Oxygen may be provided by separating nitrogen from air, such as in an air separation plant.

This invention also features a direct fired system and method largely similar to the system and method heretofore described wherein the recycled $CO_2$ working fluid is conducted from the heat exchanger, after being heated therein, directly to the first turbine. The combustion chamber which is disposed before the first turbine in the prior embodiment is eliminated entirely. Instead a combustion chamber is utilized as the means for reheating between the first and second turbines. The combustion chamber accordingly burns carbonaceous fuel and oxygen as well as recycled $CO_2$ which has been delivered to it from the first turbine (labelled the second turbine in this embodiment) thereby providing a combustion gas product which includes carbon dioxide and water at substantially the first pressure and above 31° C. The remainder of this single burner system and method is identical to the system and method of the previous embodiment. Each of the preferred elements and features of the double burner system and method may be incorporated within the single burner embodiment.

An improved indirect fired power system and a method for enhancing the efficiency of a power system having a first loop generating and employing $CO_2$ as a combustion gas and a second independent loop employing $CO_2$ as working fluid is also featured by this invention. A mixture which includes oxygen, a carbonaceous fuel, such as coal, and recycled $CO_2$ combustion gas are burned in means for burning such as a multiple stage fluidized bed burner to provide a combustion gas including $CO_2$ and water. The gas is passed through a first duct of a first heat exchanger where it transfers heat to $CO_2$ working fluid having a first supercritical pressure and temperature, but a temperature lower than the combustion gas which passes through a second duct thereof. The combustion gas 14 is then passed through the first duct of a second heat exchanger where it transfers heat to a cooler liquid such as water passing through a second duct of the heat exchanger. The liquid is thus caused to boil. The combustion gas is then cooled in cooling means, such as a condensor, so that the water in the gas is condensed. Means are provided for separating the water from the gas to provide the recycled combustion gas.

The working fluid from the first heat exchanger is expanded through a first turbine to generate power and reduce the fluid pressure while maintaining a supercritical temperature. The fluid is then reheated to a higher temperature, typically within one stage (the lean bed) of the fluidized bed burner. A second turbine then permits expansion of the fluid to a third pressure thereby generating additional power while maintaining the fluid in a supercritical state.

The fluid is then conducted through the first duct of a third heat exchanger so that it transfers heat to a cooler recycled working fluid at substantially the first pressure passing through the second duct of the heat exchanger. The working fluid itself maintains a supercritical state. The fluid is then cooled in first cooling means to a first temperature and compressed to a fourth pressure. The fluid is cooled in second cooling means to a second temperature at essentially the liquid/gas interface thereof and preferably at least 27° C. The first and second cooling means typically include condensors. Second compression means compress the fluid to substantially the first pressure to thereby provide recycled supercritical $CO_2$ working fluid.

In a preferred embodiment, the liquid, such as water, which is boiled in the second heat exchanger may be preheated in the means for burning. Means may be provided for drawing $CO_2$ combustion gas for ancillary use thereof. The $CO_2$ combustion gas may be employed to initially supply and periodically replenish the $CO_2$ working fluid. Means may also be provided for drawing one or more noble gases from the combustion gas. Power from either of the turbines may be utilized to operate either of the compression means or other ancillary equipment. An air separation plant or other means may be used to separate at least nitrogen from an air supply to provide oxygen for combustion.

Other objects, features and advantages of the invention will be apparent from the following detailed description of preferred embodiments with reference therein to the accompanying drawing in which:

BRIEF DESCRIPTION OF THE DRAWING

FIG. 6 is a graph illustrating the temperature versus entropy/enthalpy relationship exhibited by the system and method of FIG. 5.

DETAILED DESCRIPTION OF PREFERRED EMBODIMENTS

Figure 1:
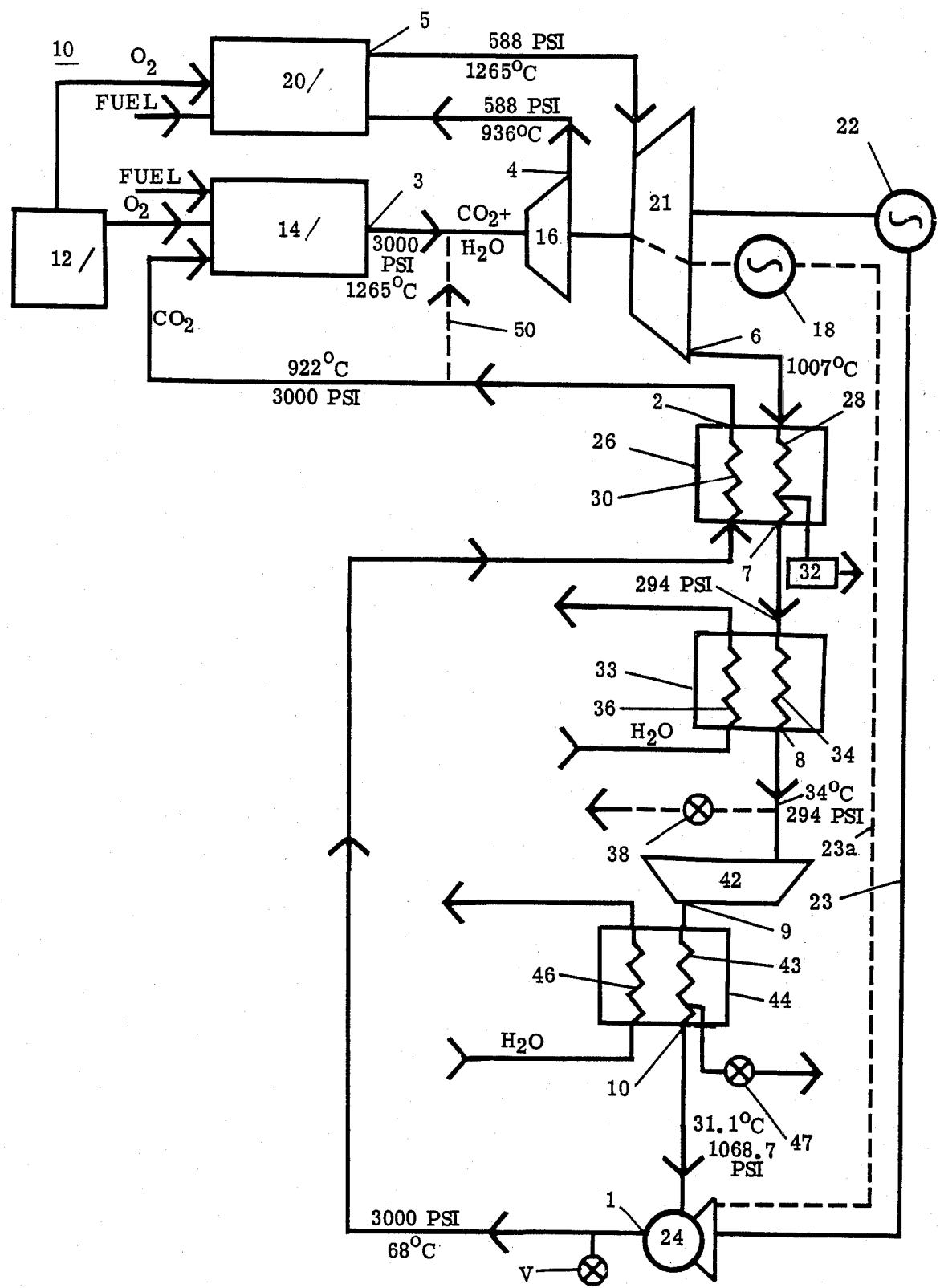
FIG. 1 is a diagrammatic view of a preferred embodiment of a direct fired carbon dioxide power system and method of this invention.

There is shown in FIG. 1 a carbon dioxide power system 10 according to this invention. An integrated air separation plant 12 separates air into constituent elements such as nitrogen, carbon dioxide, oxygen etc., and provides oxygen ($O_2$) to a high (e.g. 3000 PSI) pressure combustion chamber 14. Note that such oxygen may contain valuable rare gases such as argon. A fossil fuel such as natural gas or a distillate typically in gaseous or liquid form is also provided to chamber 14. Recycled carbon dioxide ($CO_2$) is also added at a supercritical pressure to the mixture which is then burned within chamber 14 to provide a combustion gas (which includes carbon dioxide, water and perhaps argon or other noble gas). This gas is vented from chamber 14 at a pressure at or above 1068.7 psi (the critical pressure of carbon dioxide). For example, the combustion gas may be vented at a pressure of 3000 psi and a temperature of approximately 1265° C. Note that the gases produced by combustion may vary in temperature somewhat. Burner 14, may in fact, operate over a range of 650° C. to 1650° C. and be within the known state of the art in turbine expansions. At 650° C., the actual efficiency of the power system would be 40% or less whereas at 1650° C. the efficiency is above 60%. Such percentages are below Carnot efficiencies due to non-isontropic and pressure losses in real power systems. The lower temperature also corresponds to indirect heat transfer at high pressure due to materials of construction constraints. Conversely, the upper temperature level is the practicable limit of existing high temperature turbine technology for a direct fired system. Specific examples of pressure and temperatures are provided therein as merely illustrative of representative values of this invention and should not be construed as limiting the ranges provided in the claims. The gas is primarily $CO_2$ with small percentage of steam and trace elements. The combustion gas is expanded through a turbine 16 and exhausted therefrom at a subcritical pressure of 588 psi and a temperature of 936° C. Turbine 16 is thus operated in a conventional manner to drive a generator 18, which converts the turbine's rotary motion to electrical power.

It is possible to utilize the shaft power derived from turbine 16 to drive ancillary equipment such as pumps, etc. Such a connector, 23a, is shown from generator 18 to pump 24. The shaft power from turbine 21, described hereinafter, is thus available for other purposes.

A reheating burner 20 connected to turbine 16 reheats the combustion gas to a temperature of 1265° C. Note that additional fuel and $O_2$ may be added thereto. The pressure of the gas remains at approximately 588 psi. This gas is again permitted to expand through a turbine 21 such that the gas is exhausted therefrom at a reduced temperature of 1007° C. and pressure of 294 psi. Turbine 21 is mechanically connected to operate a generator 22 and thus provide electrical power which may be utilized via line 23 to operate a pump 24 which is more fully described hereinafter. Alternatively, the shaft of the turbine may be directly coupled to pumps 24 and 42 to provide power thereto. Note also that electrical power from load 18 may be employed via line 23a to operate pump 24.

A heat exchanger 26 includes a duct 28 which accommodates combustion gas received from turbine 21. A duct 30 accommodates recycled carbon dioxide which has a low temperature of approximately 31.1° C. and has been compressed into a supercritical form as will be described hereinafter. The combustion gas in duct 28 transfers heat to the carbon dioxide in duct 30. Accordingly, the combustion gas is cooled to a temperature of 68° C. while maintaining a subcritical pressure of 294 psi. At this point, the temperature of the combustion gas remains above the critical temperature of carbon dioxide. However, water condenses from the gas and is removed therefrom by a water purging apparatus 32.

The remaining combustion gas (primarily or entirely carbon dioxide) passes through a duct 34 of a condensor 33. Cooling water passes through a second duct 36 of condensor 33 and absorbs heat from the combustion gas to cool the gas to or slightly above the critical temperature of carbon dioxide (i.e. to approximately 31° C.). Pressure following condensation remains low at approximately 294 psi.

At this point in the cycle, the excess carbon dioxide generated by combustion may be drawn off by a valve 38. Valuable $CO_2$ may thus be put to uses such as for injection into viscous oil deposits for enabling enhanced recovery therefrom or for solvent processes.

Remaining carbon dioxide combustion gas is compressed by a compressor 42 to a pressure equal to or slightly above 1068.7 psi; in FIG. 1, a pressure of 1068.7 psi is provided. Such compression raises the temperature of the carbon dioxide to 76° C.

This gas is then passed through a duct 43 of a second condensor 44 such that cooling water passing through a second duct 46 cools the carbon dioxide to slightly below, at, or slightly above its critical temperature, for example to 31.0° C. Argon or other noble or inert gases present in the combustion gas may be readily removed via a valve 47. The gaseous or quasi-liquid carbon dioxide is then compressed by a supercritical pump 24 to a supercritical (i.e. above 1068.7 psi) pressure of 3000 psi to provide a recycled carbon dioxide working fluid in a supercritical phase and having a temperature of 68° C. Supercritical $CO_2$ may also be tapped by valve V for use in enhanced oil recovery or solvent processes or simply sold to industry. Note that pump 24 may be operated by either of generators as heretofore described. This recycled carbon dioxide passes in heat exchange relationship with the high temperature combustion gas in heat exchanger 26. The recycled carbon dioxide at supercritical pressure is thus heated to a temperature of 922° C. In this manner, a large amount of the carbon dioxide enthalpy is recovered and energy efficiency is enhanced. The effectively preheated recycled carbon dioxide is provided to combustion chamber 14.

As indicated by the alternative paths taken by the recycled carbon dioxide two alternative direct fired techniques are possible: carbon dioxide may be mixed completely with oxygen and fuel in burner 14 prior to combustion in Burner 14. Burner 14 may comprise a catalytic burner to effect complete combustion of fuel and oxygen. Alternatively, a portion 50 of the preheated $CO_2$ may be mixed with the combustion product prior to expansion through turbine 16 and heating in burner 20. In such cases, burner 14 is typically a high pressure burner such as is being developed for use in down hole burners in the oil recovery art. Whereas the prior art utilizes water and steam to moderate burner flame, the present invention employs excess $CO_2$.

Figure 2:
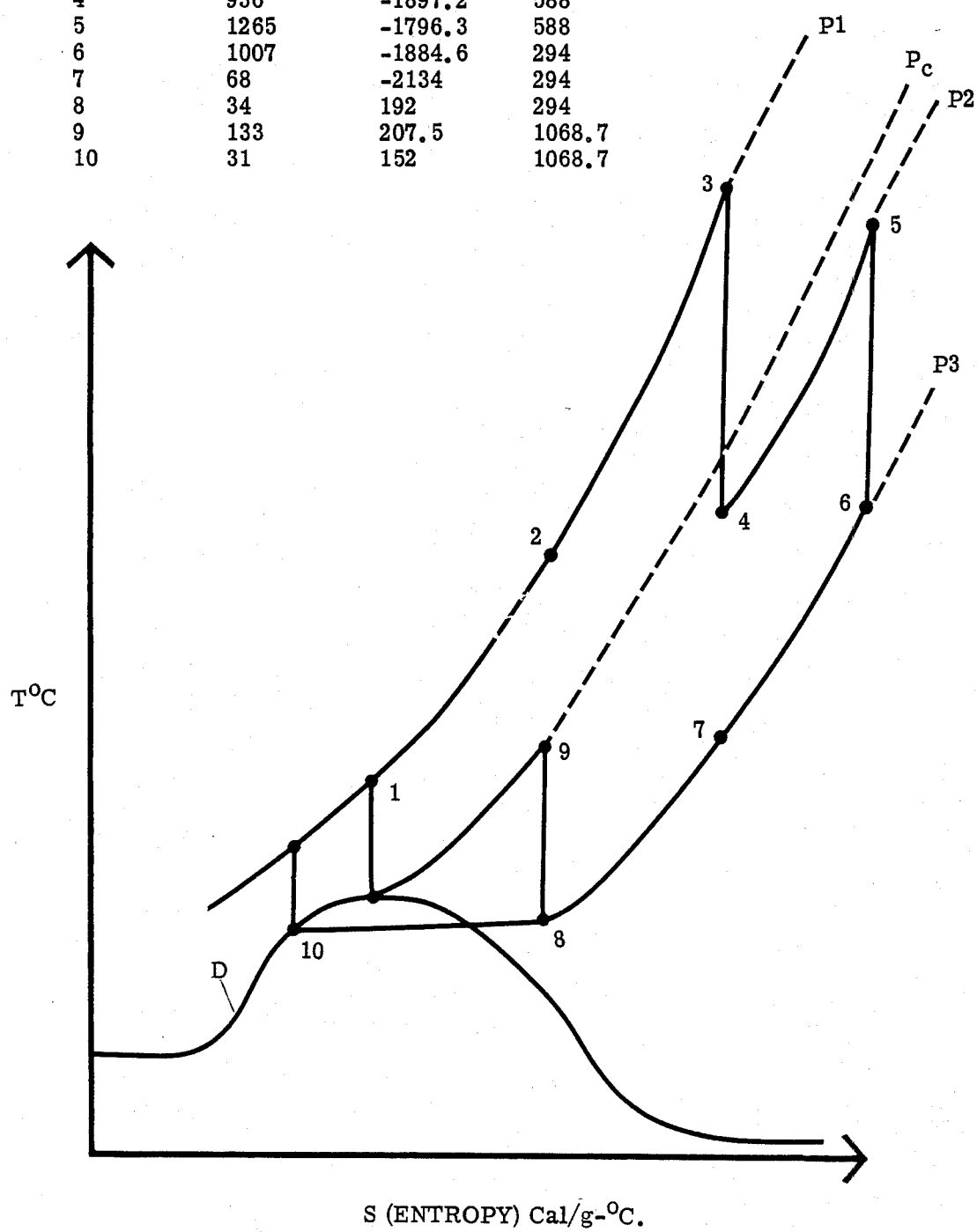
FIG. 2 is a graph illustrating the relationship of temperature versus entropy/enthalpy exhibited by the system and method of FIG. 1.

There is shown in FIG. 2 a graph which illustrates the relationship between entropy (cal/g°K.) and temperature (°K.) exhibited by the carbon dioxide working fluid of the power system and method of this invention. Dome D is the carbon dioxide dome. At points above this line $CO_2$ exists as a gas and below line D carbon dioxide can exist as a liquid or solid. This invention provides for enhanced efficiency by ensuring that each step in the power cycle is proximate or above the peak of the $CO_2$ dome D (e.g. carbon dioxide is always in a quasi-liquid or supercritical state).

By operating at or above the peak of the dome at high pressure, the system avoids the necessity of replacing the latent heat of condensation which is lost by entering the dome, e.g. when $CO_2$ working fluid is condensed. Note, however, that the dome may be pierced and $CO_2$ condensed by the system of this invention. Typically this level of cooling (to below 31° C.) occurs only to aid in separating rare gases from the combustion gas. When such rare gases are absent, the temperature is maintained above 31° C. When $CO_2$ drops in temperature to a point significantly below the peak of the dome, (e.g. below 27° C.), the lost latent heat of condensation to the condensor which would have to be resupplied as heat of compression or otherwise typically makes the system prohibitively inefficient. Therefore, operation is usually maintained at 27° C. or above. The significant enthalpy loss to the cooling water condensor which occurs when the dome is pierced and the $CO_2$ condensed is also greatly reduced by operating proximate the level of the "dome", (e.g. above 27° C.).

The pumping power requirements are not significantly affected by whether the $CO_2$ is in a liquid or supercritical phase. The mixture density is the same in either case except for minor differences in temperature.

Again, specific temperatures and entropy levels are provided herein as approximations and illustrations of this invention and should not be understood as limiting its actual ranges exhibited by the cycle of this invention. Note that the steps described in FIG. 2 are also illustrated at their appropriate points in FIG. 1.

At Step 1, carbon dioxide has been compressed to a supercritical pressure $P_1$, for example 3000 psi and a temperature of 68° C. Enthalpy of the system (derived from Mollier Charts in the Standard Handbook For Engineers) is 157 cal/g. This supercritical pressure is maintained as the recycled $CO_2$ is transferred enthalpy from the hot combustion product, Step 2, thereby heating to a temperature of 922° C. and increasing in enthalpy 249 cal/g to 406.4 cal/g. Note the corresponding drop in enthalpy from $-1884.6$ cal/g to $-2134$ cal/g (i.e. a drop of 294.4 cal/g in the combustion gas as it is passed in heat exchange, Step 7, with the recycled carbon dioxide.

The recycled $CO_2$ is increased in temperature to 1265° C. and enthalpy to $-1796.3$ cal/g during the combustion Step 3. Expansion through the first turbine, Step 4, drops the pressure to $P_2$, 588 psi below the critical level $P_C$, or 1068.7 psi and lowers both the temperature (to 936° C.) and enthalpy (to $-1897.2$ cal/g). Reheating Step 5 at this intermediate pressure 588 psi increases temperature of the combustion gas to 1265° C. and enthalpy thereof to $-1796.3$ cal/g. Second stage expansion, Step 6, drops the pressure to a level $P_3$ (e.g. for example, 294 psi) below critical level and similarly lowers temperatue to 1007° C. and enthalpy to $-1884.6$ cal/g. This enthalpy is then reclaimed by heat exchange as heretofore described, the temperature dropping to 68° C. Further cooling, Step 8, lowers $CO_2$ temperature to above the critical level of 31° C. temperature, (i.e. to 34° C., and reduces enthalpy to 192 cal/g. Compression, Step 9, increases pressure from $P_3$, 294 psi to approximately critical pressure $P_C$, 1068.7 psi and temperature and enthalpy both increase slightly. A secondary cooling stage, Step 10, reduces the temperature approximately to or slightly below critical level, (e.g. 31.1° C.) and enthalpy to 152 cal/g. Note that this point (10) on the diagram lies on the $CO_2$ dome D. However, by utilizing the method and system of this invention, this point is attained without passing significantly below the dome D (i.e. $CO_2$ temperature remains close enough to the peak of the dome D so that the $CO_2$ retains a quasi-liquid or supercritical state. The $CO_2$ is then compressed, Step 1, to a supercritical fluid and the cycle repeats. However, because of the cooling of Step 10, the pumping costs of Step 1 are minimized: less energy is expended pumping liquids than gases. The combustion gas working fluid of this invention is not converted to a true liquid phase. However, the density of the supercritical working fluid is sufficiently dense to provide for low energy (e.g. less expensive) pumping by pump 24.

Because a supercritical phase is maintained at step 10, significant system efficiencies result. Where the $CO_2$, which condenses below critical temperature, is cooled sufficiently below the peak, enthalpy losses ensue. Latent heat is released to the condensor 44 and such heat must be resupplied during or prior to compression by pump 24. Conversely, the method and apparatus of this invention teach maintaining the $CO_2$ at a sufficiently high temperature that the working fluid remains in a supercritical phase. Therein gas and liquid are indistinguishable and there is little latent heat loss due to condensation. System efficiency is greatly enhanced. This efficiency is attained only by maintaining the temperature at or above approximately 27° C.

The two stage burner system shown in FIGS. 1 and 2 provides for an enhanced work output and provides working fluid at a higher temperature so that more heat may be exchanged to the recycled fluid at point 2 in the cycle. Additionally, turbine expansions may be tailored to optimum mechanical requirements for providing pumping (e.g. from turbine 16) and power generation (e.g. from turbine 21).

The use of two condensors (33, 44) and two pumps (42, 44) to direct the working fluid through cycle steps 8, 9, 10, and 1, (as taught by this invention) reduces the work requirement considerably from that required by the prior art. As shown in the standard Mollier Charts (Temperature versus Entropy) in the Standard Handbook for Engineers, the constant enthalpy lines are nearly perpendicular to the entropy axis, thus minimal energy is expended in compression steps point 8 to point 9 and point 10 to point 1 and cooling steps points 7 to points 8 and points 9 to points 10, whereas systems of the prior art, proceed substantially horizontally from point 8 to point 10. In such prior art systems, the $CO_2$ dome D must be crossed at a level significantly below that at which the $CO_2$ condenses. Considerable work is expended during this sequence. Further, as can be seen, much more work is required of the prior art in order to compress the working fluid from point 10 to point 1 than is required of the present invention when compressing the $CO_2$ from point 10 to point 1, (e.g. $\Delta T$ is less for the present invention).

Figure 3:
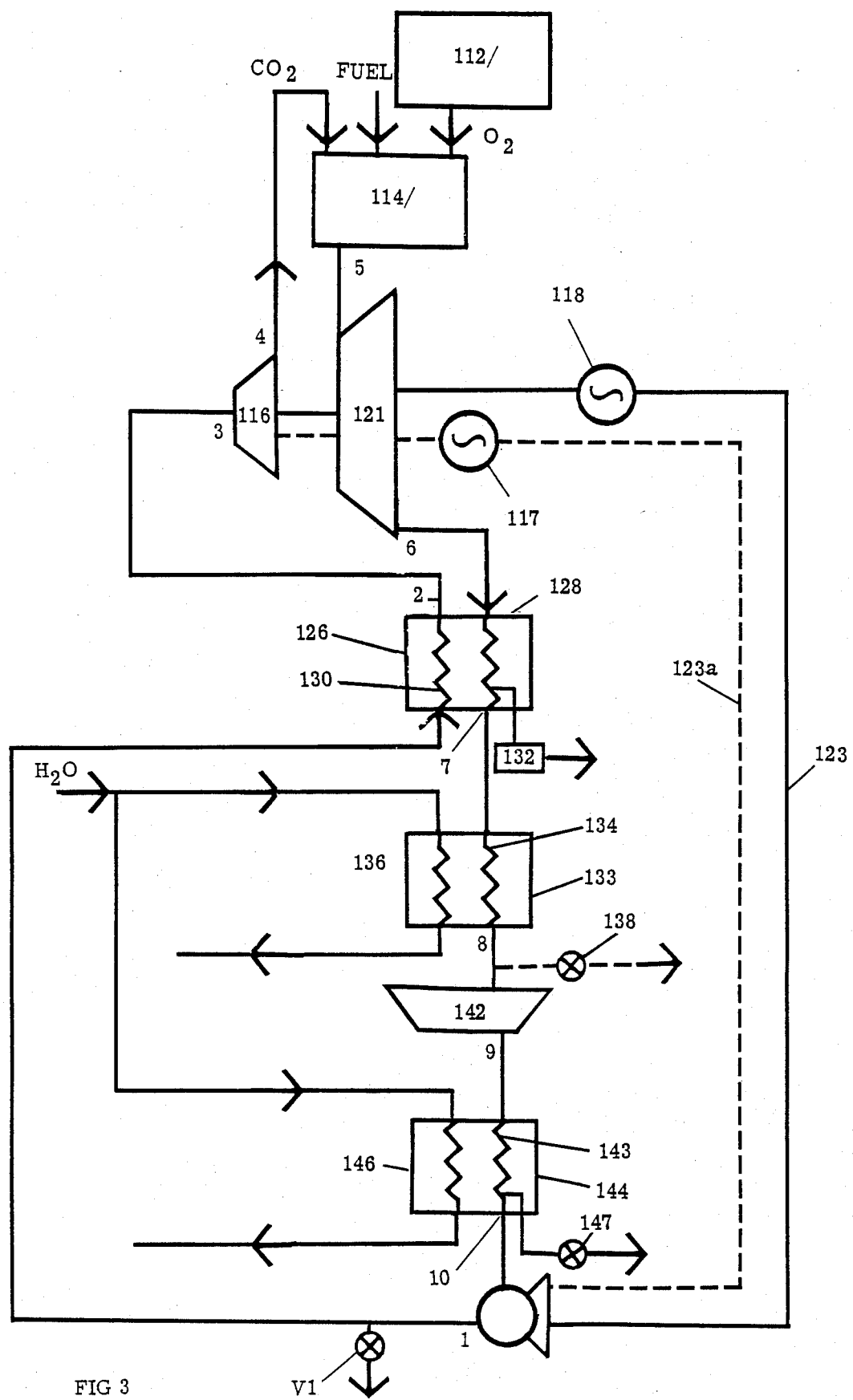
FIG. 3 is a diagrammatic view of the system and method of this invention utilizing a single burner.
Figure 4:
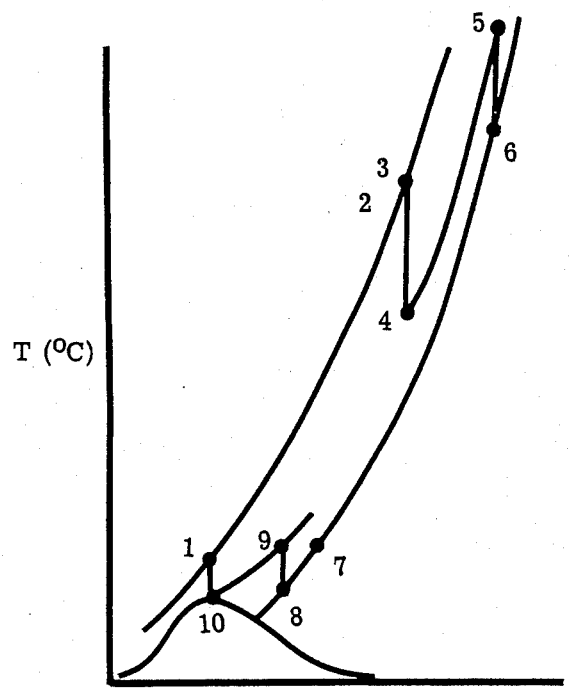
FIG. 4 is a graph illustrating the relationship of temperature versus entropy/enthalpy exhibited by the system and method of FIG. 2.

An alternative embodiment of this invention, utilizing a single burner 114, is disclosed in FIGS. 3 and 4. An integrated air separation plant 112 separates air into constituent elements such as nitrogen, carbon dioxide, oxygen, etc. and provides oxygen ($O_2$) to a combustion chamber 114. The oxygen may contain oxygen or other noble gases. A carbonaceous fuel in fluid form is also provided to chamber 114.

Recycled carbon dioxide ($CO_2$) at a sub-critical pressure of 588 psi is added to the mixture which is then burned within chamber 114 to provide a combustion gas which includes carbon dioxide, water and perhaps oxygen and/or one or more other noble gases. This gas is vented from chamber 114, step 5, at 588 psi and a temperature of 1527° C. The gas is then expanded through a first turbine 121 and exhausted, Step 6, therefrom at a pressure of 294 psi and temperature of 1255° C. Turbine 121 operates conventionally to drive a generator 118 to provide electrical power to operate ancillary equipment, such as pump 124 via a line 123. Alternatively, the shaft of turbine 121 may be directly coupled to pump 124 to provide power thereto.

A heat exchanger 126 includes a duct 128 which accommodates combustion gas received from turbine 121. A duct 130 accommodates recycled carbon dioxide which has a temperature of approximately 68° C. and has been compressed into a supercritical form as will be described hereinafter. The combustion gas in duct 128 transfers heat to the carbon dioxide in duct 130. Accordingly, the combustion gas is cooled to a temperature of 68° C. while maintaining a subcritical pressure of 294 psi. At this point, the temperature of the combustion gas remains above the critical temperature of carbon dioxide. However, water condenses from the gas and is removed therefrom by a water purging apparatus 132.

The remaining combustion gas (primarily or entirely carbon dioxide) passes through a duct 134 of a condensor 133. Cooling water passes through a second duct 136 of condensor 133 and absorbs heat from the combustion gas to cool the gas to or slightly above the critical temperature of carbon dioxide (i.e. approximately 31,0° C.). Pressure following condensation remains low at approximately 294 psi.

At this point in the cycle, the excess carbon dioxide generated by combustion may be drawn off by a valve 138. Valuable $CO_2$ may thus be put to uses such as for injection into viscous oil deposits for enabling enhanced recovery therefrom or for solvent processes.

Remaining carbon dioxide combustion gas is compressed by a compressor 142, Step A, to a pressure equal to or slightly above 1068.7 psi; in FIG. 3, a pressure of 1068.7 psi is provided. Such compression raises the temperature of the carbon dioxide to 133° C.

This gas is then passed through a duct 143 of a second condenser 144, Step 10, such that cooling water passing through a second duct 146 cools the carbon dioxide to slightly below, at or slightly above its critical temperature, for example to 31.1° C. Argon or other noble or inert gases present in the combustion gas may be readily removed via a valve 147. The carbon dioxide is then compressed, step 1, by a supercritical pump 124 to a supercritical (i.e. above 1068.7 psi) pressure of 3000 psi to provide a recycled carbon dioxide working fluid in a supercritical phase and having a temperature of 68° C. Supercritical $CO_2$ may also be tapped by valve V for use in enhanced oil recovery or solvent processes or simply sold to industry. Note that pump 124 may be operated by generator 118 as heretofore described. This recycled carbon dioxide passes in heat exchange relationship, step 2, with the high temperature combustion gas in heat exchanger 126. The recycled carbon dioxide at supercritical pressure is thus heated to a temperature of 1265° C. In this manner, a large amount of the carbon dioxide enthalpy is recovered and energy efficiency is enhanced. The effectively preheated recycled carbon dioxide is then provided to a turbine where it is expanded to reduce to a subcritical pressure of 588 psi. Note that steps 2 and 3 are effectively combined, e.g. the first heating step is eliminated. Power generated by turbine 116 (via generator 117) may be used to satisfy power requirement or to drive ancillary equipment such as pump 124 (via line 123a).

A graph of temperature versus entropy/enthalpy and a chart illustrating the pressure, temperature and enthalpy measurements taken at point 1-10 of the system of FIG. 3 are shown in FIG. 4. Note that again the $CO_2$ dome is touched at point 10 (e.g. $CO_2$ is dropped to 31.1° C.) but is not penetrated significantly (e.g. below 27° C.). Therefore, latent heat losses are kept to a minimum and efficiency is enhanced.

Figure 5:
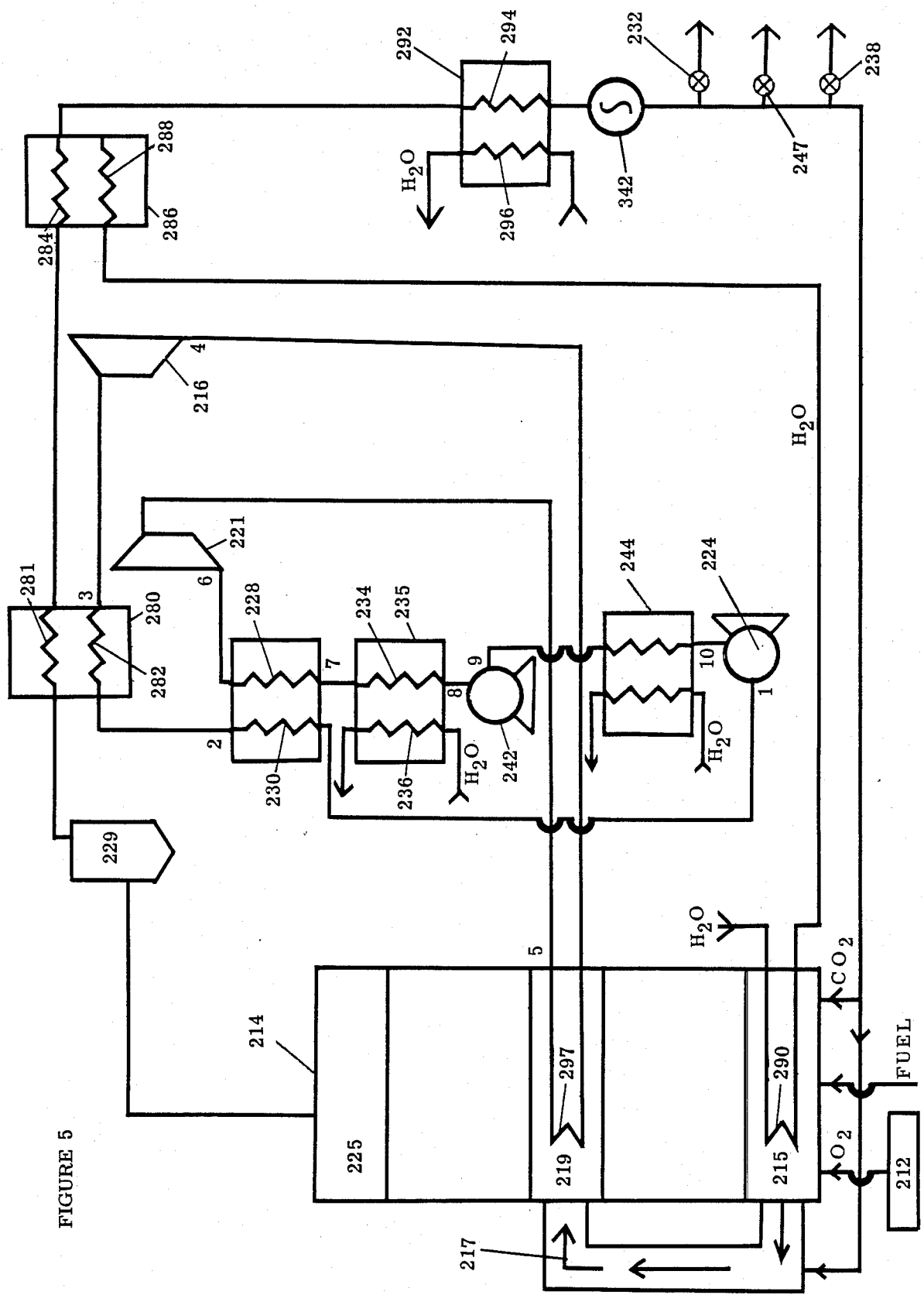
FIG. 5 is a diagrammatic view of the indirect system and method of this invention utilizing a three-stage burner in the combustion loop.

An indirect fired power system which utilizes separate combustion and working fluid cycles is illustrated in FIG. 5. Carbon dioxide working fluid proceeds through a power cycle analogous to the systems of FIGS. 1–4. Note that comparable steps 1-10 are illustrated at appropriate locations.

Combustion gas is provided by a three stage fluidized bed burner 214. Coal, $O_2$ and recycled $CO_2$ combustion gas, are introduced into rich bed 215. Note the $O_2$ may again be provided by an air separator plant 212. Combustion gas is then circulated as illustrated by arrows 217 to a lean bed 219 where burning at approximately 1800° F. occurs. At the burner stage 225, maintained at 1560° F., $SO_X$ sorbent is introduced to facilitate pollutant removal. The combustion gas is then cleaned of particulates by cyclone dust catcher 229 and provided to duct 231 of heat exchanger 280.

Carbon dioxide working fluid is, meanwhile, conducted through duct 282 of heat exchanger 280 thereby capturing heat from the combustion gas and utilizing such heat in a manner described hereafter.

The combustion gas leaves heat exchanger 280 and proceeds to a duct 284 of a second heat exchanger 286 where it transfers heat to water being conducted through a second duct 288. At least a portion of the water is thus boiled to steam for ancillary use. Note that this water may be conducted through a loop 290 passing through rich bed 215.

After leaving heat exchanger 286, the combustion gas is cooled within a condenser 292 wherein it passes via duct 294 in heat exchange relationship with water in duct 296. The water in the combustion gas is thus condensed and may be separated from the $CO_2$ by a valve 232. Pressure losses sustained during circulation of the combustion fluid are recovered by compressing the fluid in compressor 342. Noble gases, which may be present in the combustion products may be drawn by valve 247 and $CO_2$ itself may be drawn for ancillary purposes by the valve 238. The $CO_2$ remaining in the system is recycled to either rich bed 215 and or lean bed 219 for combustion temperature moderation.

The working fluid portion of this system operates analogously to the previously discussed embodiments of this sytem. Reference should be made to the numbered steps shown in FIG. 5. The temperature and entropy (enthalpy) at each of these points are illustrated by the graph of FIG. 6. Again, the reported results are exemplary only.

The working fluid passes through heat exchanger 280 at a first pressure of 3000 psi and is heated therein to a temperature of 650° C. The enthalpy level at point 3 is 334 cal/g. The working fluid is then expanded through a turbine 216 to a pressure of 588 psi (point 4). The temperature is reduced to 520° C. and enthalpy is reduced to 294 cal/g. From turbine 216, working fluid is conducted through loop 297 in bed 217 of burner 214. Therein the $CO_2$ is heated to 760° C. and its enthalpy is increased to 362 cal/g (point 5). Expansion through a second turbine 221, (point 6) reduces pressure to 294 psi. Enthalpy and temperature are reduced slightly to 336 cal/g and 667° C. respectively.

The working fluid is then conducted through a duct 228 of a heat exchanger 226 where it transfers a portion of its heat to recycled $CO_2$ working fluid passing through duct 230. Note that the drops in temperature and enthalpy (599° C. and 142 cal/g respectively) experienced by the working fluid at point 7, closely approximates the gain in temperature and enthalpy (469° C. and 142 cal/g) experienced by the recycled $CO_2$ at point 2.

Following the above heat transfer, the working fluid is cooled within a condenser 235 passing therein via duct 234 in heat exchange relationship with cooling water in duct 236. At point 8 the temperature is thus 34° C. and the enthalpy is 185 cal/g. The working fluid is then compressed to critical pressure of 1068.7 psi by a compressor 242. Temperature and enthalpy are increased slightly (point 9). A second condenser 244 enables additional cooling of the $CO_2$ by water. The $CO_2$ is cooled to 31° C., critical temperature, and is lowered in enthalpy to 152 cal/g. As taught by this invention, the $CO_2$ may in fact be cooled to 27° C. Below that level the energy required to recapture lost enthalpy becomes larger than is efficiently feasible.

A compressor 224 compresses the working fluid to 3000 psi and increases its temperature to a supercritical level of 68° C. (point 1) at which the recycled working fluid is delivered to heat exchanger 226 for the recapturing of heat therein.

Because the working fluid CO₂ is maintained at all times above or close to the peak of the liquid/gas dome D, this embodiment likewise exhibits enhanced efficiency over power systems of the prior art. Because the operating temperature of the three stage fluidized bed burner is substantially lower than that of the combustion chamber 14 of FIG. 1, the efficiency of the indirect embodiment is typically less than that of the direct fired system. However, the indirect system has the advantage of operating on coal and other relatively inexpensive fuels. Bed 219 effectively removes SO₂ pollutants from the combustion gas and the cyclone performs a similar function upon particulates.

Note also that, although, in each of the embodiments described herein the temperature at step 10 may drop to critical temperature, e.g. to 31° C. or below in order to condense the working fluid to enable recovery of argon or other rare noble gases. However, if the temperature at point 10 is maintained at 27° C. or above, the latent heat loss remains small enough to be feasibly sustained. Enhanced cycle efficiencies are thereby achieved: Maximum (Carnot) efficiency is provided by the equation (Thot - Tcold)/Thot where T is measured in degrees Kelvin. Turbine inlet temperatures of 2000° F. and above are attainable by using the direct fired system of this invention. Consequently, if the cold temperature is considered the critical temperature of CO₂, (e.g. 31° C. or 88° F., it may readily be calculated that a maximum (Carnot) efficiency of over 80% is exhibited. For example, in the embodiment of FIGS. 1 and 2, Thot is 1265° C. or 1538° K. and Tcold is 88° F. or 304° K. The Carnot efficiency is thus (1538° K.−304° K.)/1538° K.=80%. Conversely, in indirect systems of the prior art material constraints of heat exchanges, etc., limit the temperatures at which they operate. Accordingly, efficiency is limited to approximately 38%.

The power generated by the system far outweighs the power required to separate oxygen from the air. Only half of the volume of nitrogen removed by an air separation plant need be replaced by CO₂ in order to obtain a comparable flame temperature. Because nitrogen is absent from the mixture to be burned, equipment and capital expenses are reduced and pollutants of NO$_X$ are also eliminated. Note that when a sulfur free fuel is utilized, SO$_X$ pollutants are also absent from the combustion product.

The system is readily adaptable to existing air separation plants and enables relatively inexpensive production of power and industrial gases as well as recovery of rare noble gases. The CO₂ which may be drawn from this system is particularly useful in applications such as in recovery of heavy oil reserves. Also, the supercritical CO₂ may be utilized as in solvent extraction techniques. Applications in this area include degreasing, de-oiling drilling chips on offshore platforms and recovering rare essences, flavors and extract in pure form without damaging the base material and without leaving a toxic or deleterious residue. Substitution of oxygen with carbon dioxide in the mixture to be burned permits complete control of flame temperatures and control of hardware durability. It avoids certain of the combustion gas interactions with high temperature refractory combustion liners, such as silicon carbides, which may be experienced with water/steam moderated flame systems such as are used in the enhanced oil recovery art. The system of this invention also generates more water then is likely to be lost through cooling in condensors if cooling towers are utilized. The use of oxygen rather than air under high pressure (e.g. 3000 psi) conditions for combustion enables a significant reduction of burner size as well as greatly speeding the rate of combustion. The working fluid produces a substantial output of water which may be readily upgraded at low cost to drinking water for supplying areas suffering from a lack of that resource.

It is evident that those skilled in the art, once given the benefit of the foregoing disclosure, may now make numerous other uses and modifications of, and departures from, the specific embodiments described herein without departing from the inventive concepts. Consequently, the invention is to be construed as embracing each and every novel feature and novel combination of features present in, or possessed by, the apparatus and techniques herein disclosed and limited solely by the spirit and scope of the appended claims.

What is claimed is:

1. An improved direct fired power system generating and employing a combustion gas which includes carbon dioxide as a working fluid comprising:

means defining a combustion chamber for burning a mixture which includes oxygen, a carbonaceous fuel and recycled carbon dioxide working fluid at a supercritical first pressure, thereby providing a combustion gas which includes carbon dioxide and water at substantially said first pressure, and a supercritical temperature, means defining a first turbine for receiving combustion gas from said combustion chamber and allowing said gas to expand therethrough to generate power and reduce the pressure of said combustion gas to a second pressure while maintaining a supercritical state, means for receiving said combustion gas from said first turbine and heating said gas at said second pressure to a higher temperature means defining a second turbine for receiving combustion gas from said means for heating and allowing said gas to expand therethrough to generate power and further reduce the pressure on said combustion gas to a third pressure while maintaining a supercritical state, means defining a heat exchanger having first and second ducts in heat exchange relationship, said first duct receiving combustion gas from said second turbine and conducting said gas therethrough, said second duct conducting recycled carbon dioxide working fluid at substantilly said first pressure and a temperature below that of said combustion gas in said first duct therethrough and having an output connected to said combustion chamber for providing at least a portion of said recycled carbon dioxide thereto, for enabling said combustion gas to transfer heat to said recycled carbon dioxide to condense at least a portion of the water in said combustion gas, but maintain the carbon dioxide thereof in a supercritical state, means for separating the condensed water from the remainder of said combustion gas first cooling means connected to the output of said first duct of said heat exchanger for receiving combustion gas therefrom and cooling said combustion gas to a supercritical first temperature, first compression means for receiving said combustion gas from said first cooling means and compressing said combustion gas to a fourth pressure below said first pressure, second cooling means for receiving said combustion gas from said first compression means and cooling said combustion gas to a second temperature at essentially the liquid/gas interface of said combuston gas and, second compression means for receiving said combustion gas from said second cooling means and compressing said gas to substantially said first pressure to thereby provide said recycled carbon dioxide working fluid, said second compression means being connected to the input of said second duct of said heat exchanger for providing said recycled carbon dioxide thereto.

2. System in accordance with claim 1 wherein said first means for cooling includes a condensor having a first duct connected between said first duct of said heat exchanger and said first compression means for conducting combustion gas therethrough and a second duct in heat transfer relationship with said first duct for conducting a cooling fluid therethrough.

3. System in accordance with claim 1 wherein said second cooling means includes a condensor having a first duct connected between said first compression means and second compression means for conducting combustion gas therethrough and a second duct in heat transfer relationship with said first duct for conducting a cooling fluid therethrough.

4. System in accordance with claim 1 further including means for drawing carbon dioxide from said system for ancillary use.

5. System in accordance with claim 1 wherein said means for drawing carbon dioxide is located between said first cooling means and said first compression means.

6. System in accordance with claim 4 wherein said means for drawing carbon dioxide is located between said second compression means and said heat exchanger to provide supercritical carbon dioxide product.

7. System in accordance with claim 1 wherein one or more noble gases are mixed with the oxygen in said combustion chamber and thereby present in said combustion gas and further including means for drawing said noble gases from said combustion gas for ancillary use thereof.

8. System in accordance with claim 1 wherein said means for separating condensed water from said combustion product are connected to said first duct of said heat exchanger.

9. System in accordance with claim 2 wherein said means for separating are connected to said first duct of said first condensor.

10. System in accordance with claim 1 wherein said second compression means includes a pump.

11. System in accordance with claim 10 wherein at least a portion of power generated by either of said first or second turbines is used to operate said pump.

12. System in accordance with claim 1 further including air separation means for separating at least nitrogen from an air supply to provide oxygen for burning in said combustion chamber.

13. System in accordance with claim 1 wherein said second cooling means cools said combustion gas to no lower than 27° C.

14. A method for enhancing the efficiency of a power cycle which generates and employs a combustion gas including carbon dioxide as a working fluid comprising:

introducing a mixture which includes oxygen, carbonaceous fuel and recycled carbon dioxide gas at a supercritical first pressure into a combustion chamber and burning said mixture to provide a combustion gas which includes carbon dioxide and water at substantially said first pressure and a supercritical temperature, allowing said combustion gas to expand through a first turbine to generate power and reduce the pressure of said combustion gas to a second pressure while maintaining a supercritical state, heating said combustion gas at substantially said second pressure to a higher temperature, allowing said reheated combustion gas to expand through a second turbine to generate power and further reduce the pressure of said combustion gas to a third pressure while maintaining a supercritical state, passing said combustion gas in heat exchange relationship with recycled carbon dioxide working fluid at said first pressure and a temperature lower than said combustion gas whereby heat is transferred from said combustion gas to said recycled carbon dioxide to condense at least a portion of the water in said combustion gas but maintain the carbon dioxide therein in a supercritical state, cooling said combustion gas to a first temperature, compressing said combustion gas to a fourth pressure below said first pressure, cooling said combustion gas to a second temperature at essentially the liquid/gas interface of said combustion gas, compressing said combustion gas to substantially said first pressure to provide said recycled carbon dioxide working fluid and separating condensed water from said combustion gas following either the heat exchange or cooling to a first temperature steps.

15. Method in accordance with claim 14 futher including drawing carbon dioxide from said system for ancillary use.

16. Method in accordance with claim 14 further including removing one or more noble gases from the combustion gases.

17. Method in accordance with claim 14 including mixing additional recycled carbon dioxide working fluid with said combustion gas prior to heating said combustion gas.

18. Method in accordance with claim 14 further including separating at least nitrogen from an air supply to provide oxygen for burning in said combustion chamber.

19. Method in accordance with claim 14 wherein said combustion gas is cooled to no lower than 27° C. in the cooling to a second temperature step.

* * * * *